June 23, 1931.  C. G. BANKS  1,811,226
HIGH PRESSURE HOSE
Filed Nov. 11, 1927
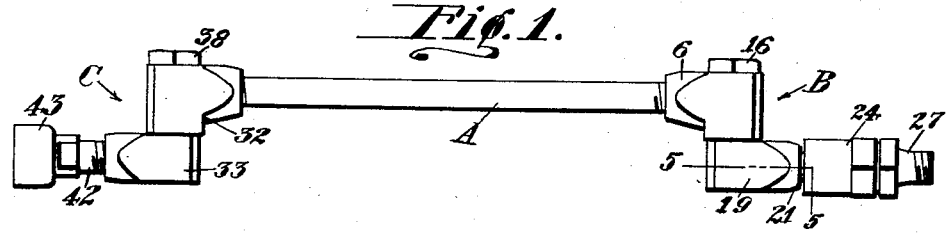
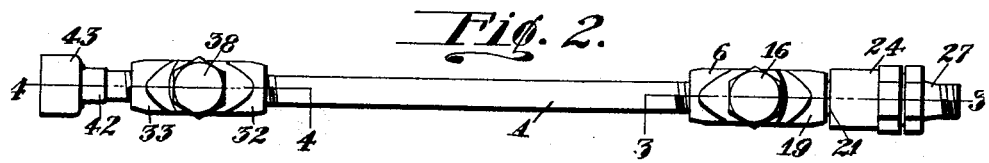
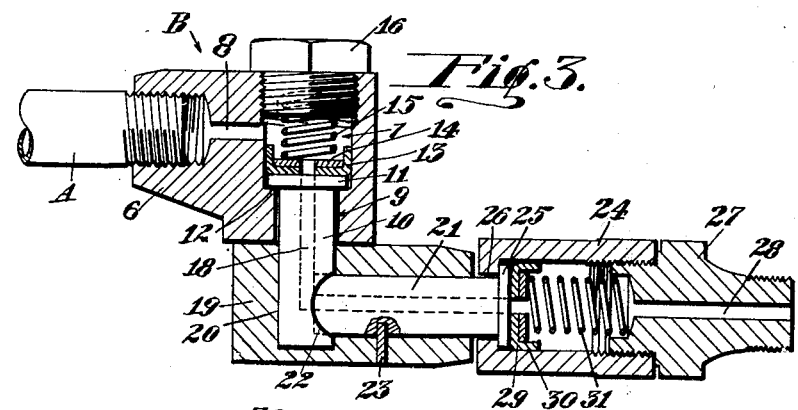
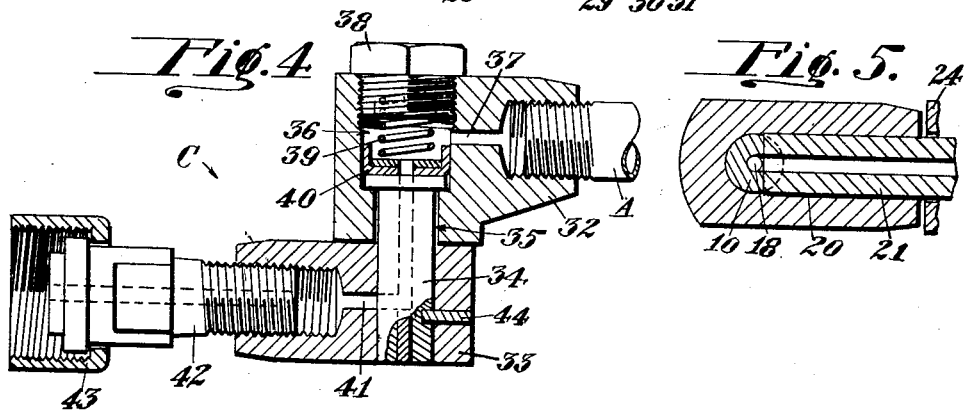
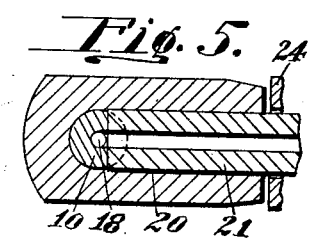
Inventor:
Charles G. Banks
By N.W. Crandall
Att'y Patented June 23, 1931

1,811,226

UNITED STATES PATENT OFFICE

CHARLES G. BANKS, OF GLENDALE, CALIFORNIA, ASSIGNOR OF ONE-HALF TO CHAS. M. O'LEARY, JR., OF LOS ANGELES, CALIFORNIA

HIGH PRESSURE HOSE

Application filed November 11, 1927. Serial No. 232,653.

This invention relates to a high pressure hose of the type embodying rigid conduits fitted with articulate connections and more particularly pertains to the construction of the swivel connections thereof.

An object of the invention is to provide a swivel connection for high pressure hose which is especially applicable for use in effecting lubrication of motor vehicles and mechanism where a heavy lubricant, such as grease is forced to the bearing surfaces under high pressure.

Another object is to provide a swivel connection in high pressure hose of the above mentioned character which is so formed that grease may be forced through the hose under extremely high pressure without danger of separating the swivel connections and without leakage through the swivel joints.

Another object is to provide a swivel joint for the purpose set forth which is simple in construction, economical in manufacture, and highly efficient in operation.

With the foregoing objects in view together with such other objects and advantages as may subsequently appear, the invention resides in the parts and in the combination, construction and arrangement of parts hereinafter described and claimed, and illustrated in the accompanying drawings, in which:

Fig. 1 is a view of a section of the high pressure hose as seen in side elevation;

Fig. 2 is a plan view of the hose section as shown in Fig. 1;

Fig. 3 is an enlarged detail in section as seen on the line 3—3 of Fig. 2;

Fig. 4 is an enlarged detail in section as seen on the line 4—4 of Fig. 2;

Fig. 5 is a detail in horizontal section as seen on the line 5—5 of Fig. 1.

Referring to the drawings more specifically, A indicates a length of rigid conduit, and B and C designate swivel joints connecting with the ends of the conduit A; the joint B being applied at the intake end, and the joint C being applied at the discharge end thereof.

Referring to Fig. 3 of the drawings, showing the construction of the swivel B, 6 indicates a block which has threaded engagement with the conduit A and is provided with a chamber 7, which communicates with the conduit A through a passage 8. Leading from the chamber 7 is a circular opening 9 through which loosely extends a tubular pivot pin 10 fitted with an end flange 11 seating on a shoulder 12 in the chamber 7. A cup washer 13 seats on the end of the pin 10 within the chamber 7 in which washer is arranged a metallic disk 14 on which seats a spring 15 bearing against a threaded plug 16 closing the outer end of the chamber 7; the spring 15 acting to maintain the cup leather 13 in position against the end of the pin 10 to seal the joint around the flange 11. The cup washer 13 and disk 14 are formed with central openings which register with the bore 18 of the pin 10. The lower end of the pin 10 is driven with a tight fit into a socket formed in a block 19 which block is arranged to slidably abut against the block 6 and through the medium of the pin 10 has swivel connection therewith. The block 19 is formed with a bore 20 into which is driven in tight fit, a tubular pivot pin 21, the inner end of which is countersunk into engagement with a recess 22 in the side of the pin 10 whereby the pins 10 and 21 are interlocked and the bores thereof brought into communication as particularly shown in Fig. 5.

A pin 23 may be driven through an opening on the block 19 and into engagement with the pin 21 to hold the latter against longitudinal movement. The pin 10 will be held against displacement by the pin 21.

The outer end of the pin 21 extends into a sleeve 24 and is provided with a flange 25 seating on a shoulder 26 formed on the sleeve. The outer end of the sleeve 24 is internally threaded to receive a coupling 27 which may be attached to a suitable conduit or connection communicating with a source of grease supply; the coupling being provided with a passage 28 leading to the interior of the sleeve 24. Arranged within the sleeve 24 and seating on the outer end of the pin 21 is a cup leather 29 on which seats a metallic disk 30 against which bears a spring 31 seating on the coupling 27; the spring 31 serving to maintain the cup leather 29 in a seated position on the end of the pin 21 so that the cup leather will serve to seal the joint around its end flange 25. The cup leather 29 and the disk 30 are formed with central openings which register with the bore of the pin 21. It will now be seen that the sleeve 24 may be turned axially around the pin 21 and that the block 6 may turn on an axis extending at right angles to the axis of the sleeve 24.

Referring now to Fig. 4 showing the construction of the swivel C, 32 indicates a block corresponding to block 6, which block 32 is screwed on the conduit A and is connected to a block 33 by means of a tubular pin 34; the pin 34 being driven into the block 33 with a tight fit and loosely extending through a bore 35 in the block 32 in a manner complementary to the mounting of the pin 10 of the swivel B; the block 32 being formed with a chamber 35 communicating with the conduit A through a passage 37 and being fitted with a screw plug 38 against which bears a spring 39 which acts to maintain a cup leather 40 seated against the upper end of the pin 34. The cup leather 40 is formed with an aperture registering with the bore of the pin 34. The bore of the pin 34 opens to the side of the latter and communicates with a passage 41 in the block 33, which in turn, communicates with a coupling 42 carrying a sleeve 43 for connection with a nozzle or other discharge connection. The pin 34 may be held against movement in the block 33 by means of a pin 44 driven into the block and engaging the pin 34. The blocks 32 and 33 slidably abut against each other and are swivelly connected together by the pin 34.

In the operation of the invention, grease forced into the passage 28 of the connection 27 will be delivered through the swivel pins 21 and 10 and through the block 6, conduit A, block 32, swivel pin 34, block 33 and coupling 42 to discharge. It will be observed that by the interlocking of the pins 10 and 21 of the swivel B, and fastening of the pin 21 and pin 34, loosening of these pins under the pressure imposed thereon by forcing the grease therethrough will be obviated.

I claim:

1. In a swivel connection for high pressure hose, a block, a pair of tubular pins extending into said block at right angles to each other, the inner end of one of said pins being counter-sunk into the side of the other pin with the bores of said pins communicating, and swivel connections on the outer ends of said pins.

2. A swivel connection for a high pressure hose, comprising a block having a pair of tubular pins arranged therein at right angles to each other and communicating at their inner ends; means for locking said pins in said block against relative movement therewith, said means including counter-sinking the inner end of one pin into the side of the other pin and locking the countersunk pin into said block by means of a smaller pin passing through a portion of said block and said pin; and swivel connections on the outer ends of said pins.

3. A swivel connection for a high pressure hose, comprising a block having a pair of tubular pins arranged therein at right angles to each other and communicating at their inner ends; means for locking said pins in said block against relative movement therewith, said means including counter-sinking the inner end of one pin into the side of the other pin and locking the countersunk pin into said block by means of a smaller pin passing through a portion of said block and said pin; and swivel connections on the outer ends of said pins, one of said swivel connections including a flange on the outer end of said pins, and a swivel block having a chamber therein provided with a shoulder forming a seat for said flange, said swivel block having a passage therein communicating with said chamber at right angles thereto.

In testimony whereof, I have affixed my signature.

CHARLES G. BANKS.